US012658807B2

(12) United States Patent
Bertoni et al.

(10) Patent No.: US 12,658,807 B2
(45) Date of Patent: Jun. 16, 2026

(54) DATA TRANSFER THROUGH AN ISOLATED POWER CONVERTER

(71) Applicant: Texas Instruments Incorporated, Dallas, TX (US)

(72) Inventors: Nicola Bertoni, Freising (DE); Giacomo Calabrese, Freising (DE); Stefano Panaro, Castelletto d'Erro (IT); Sooping Saw, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 398 days.

(21) Appl. No.: 17/363,470

(22) Filed: Jun. 30, 2021

(65) Prior Publication Data

US 2023/0006559 A1 Jan. 5, 2023

(51) Int. Cl.
*H02M 3/335* (2006.01)

(52) U.S. Cl.
CPC ............................... *H02M 3/33569* (2013.01)

(58) Field of Classification Search
CPC ................................................. H02M 3/33569
USPC ......................................................... 327/541
See application file for complete search history.

(56) References Cited

U.S. PATENT DOCUMENTS

| | | | |
|---|---|---|---|
| 2007/0009052 A1 | 1/2007 | Hershbarger | |
| 2009/0066401 A1* | 3/2009 | Saito | H03F 3/38 |
| | | | 327/379 |
| 2012/0081177 A1* | 4/2012 | Nuebling | H04L 1/1829 |
| | | | 327/590 |
| 2013/0335105 A1 | 12/2013 | Washiro | |
| 2015/0180528 A1 | 6/2015 | Ragonese et al. | |
| 2018/0152041 A1 | 5/2018 | Onishi | |
| 2019/0372749 A1 | 12/2019 | Ikeda | |
| 2022/0407425 A1* | 12/2022 | Calabrese | H02M 3/33569 |
| 2022/0415829 A1* | 12/2022 | Blecic | H01L 28/10 |
| 2025/0240188 A1 | 7/2025 | Sooping | |

OTHER PUBLICATIONS

Analog Devices. "Low Emission, 5 kV Isolated DC-to-DC Converters." Data Sheet ADuM6020/ADuM6028. One Way Technology, 2018-2020. pp. 1-20.
Texas Instruments. "ISOW784x High-performance, 5000-VRMS reinforced quad-channel digital isolators with integrated high-efficiency, low emissions DC-DC converter." Data Sheet. SLLSEY2F—Mar. 2017—Revised Mar. 2019. pp. 1-51.
Texas Instruments Publication; "UCC12051-Q1 High-Efficiency, Low-EMI, 5-kVRMS Isolation DC/DC Converter"; Jan. 2021; 32 pgs.
Texas Instruments; "TPSI3050-Q1 Automotive Reinforced Isolated Switch Driver with Integrated 10-V Gate Supply"; Nov. 2021—Revised Apr. 2023; 44 pgs.

* cited by examiner

*Primary Examiner* — Tomi Skibinski
(74) *Attorney, Agent, or Firm* — Zhenhai Fu; Frank D. Cimino

(57) ABSTRACT

An integrated circuit (IC) assembly includes a first power stage adapted to receive an input voltage and a second power stage adapted to provide an isolated output voltage. The IC also includes a transformer coupled between the first and second power stages. The IC further includes a detuning circuit coupled to the transformer, and a receiver circuit coupled to the first power stage. The receiver circuit includes an integrator configured to integrate a switching signal within the first power stage.

27 Claims, 11 Drawing Sheets dx=2.047 ns dy=2.4V

410

405

VP1
401

425

"0"

SH0
402

412

420

404
INTEG

406

403
SHn

V (V)

3.4
3.2
3.0
2.8
2.6
2.4
2.2
2.0
1.8
1.6
1.4
1.2
1.0
0.8
0.6
0.4
0.2
0.0
-0.2
-0.4

224.284   224.286   224.288   224.29   224.292   224.294   224.296   224.298

TIME (μs)

dx=1.483 ns dy=2.416V

510

505

525

"1"

VP1
501

520

SH0
502

503
SHn

512

504
INTEG

V (V)

TIME (µs)

782

Vsss - Vssp

780

781

782

782 t

DATA TRANSFER THROUGH AN ISOLATED POWER CONVERTER

BACKGROUND

A power converter is an electrical circuit (e.g., an integrated circuit, IC) that receives input electrical power and generates output electrical power derived from the input power. Some power converters are isolated converters which include a galvanic barrier between the input and the output. A galvanic isolation barrier lacks a direct electrical connection. One type of galvanic isolation barrier is a transformer, which has two inductors—a primary coil for the input and a secondary coil for the output—and there is no direct electrical connection between the primary and second coils. Isolated power converters have a wide variety of applications such as in controller area networks (CANs), power supply start-up bias and gate drives, isolated sensor interfaces, etc.

SUMMARY

In one example, an integrated circuit (IC) assembly includes a first power stage adapted to receive an input voltage and a second power stage adapted to provide an isolated output voltage. The IC also includes a transformer coupled between the first and second power stages. The IC further includes a detuning circuit coupled to the transformer, and a receiver circuit coupled to the first power stage. The receiver circuit includes an integrator configured to integrate a switching signal within the first power stage.

BRIEF DESCRIPTION OF THE DRAWINGS

For a detailed description of various examples, reference will now be made to the accompanying drawings in which.

DETAILED DESCRIPTION

At least some isolated power converters generate a regulated output voltage (referred to herein as Viso) through an isolated power channel. In one example, the input voltage may be in the range of 3V to 5.5V and Viso may be 3.3V or 5V. To regulate Viso, the power converter includes a regulation loop which includes a data channel in which data is communicated from the output of the converter through the galvanic isolation barrier to the input side of the converter to be used to control the operating point of the converter. The data channel also is isolated. In some conventional power converters, the regulation loop includes an isolated data channel that is separate from the isolated power channel (i.e., two separate isolation barriers). In the described examples, power and data are isolated through a single isolation barrier.

In accordance with the described embodiments, a transformer is used as the isolation barrier. The transformer is shared by both the power channel and the data channel. The data channel includes a detuning circuit on the secondary side of the converter and a receiver circuit on the primary side of the converter. The detuning circuit modulates a resonance on the secondary side of the transformer by, for example, connecting and disconnecting circuit components. In one example (shown in FIG. 2), the components being connected and disconnected from the secondary side are capacitors, but the components can be other than capacitors such as resistors, inductors, or diodes. In one embodiment, the receiver circuit includes an integrator to decode whether a "0" or a "1" is transmitted across the data channel. The detuning circuit causes the slew rate on a switch node within the primary side of the converter to be different when a "0" is transmitted across the data channel than when a "1" is transmitted. The integrator produces an output signal that is a function of the slew rate on the switch node. The integrator's output signal indicates whether a 0 or a 1 is being transmitted across the data channel.

Figure 1:
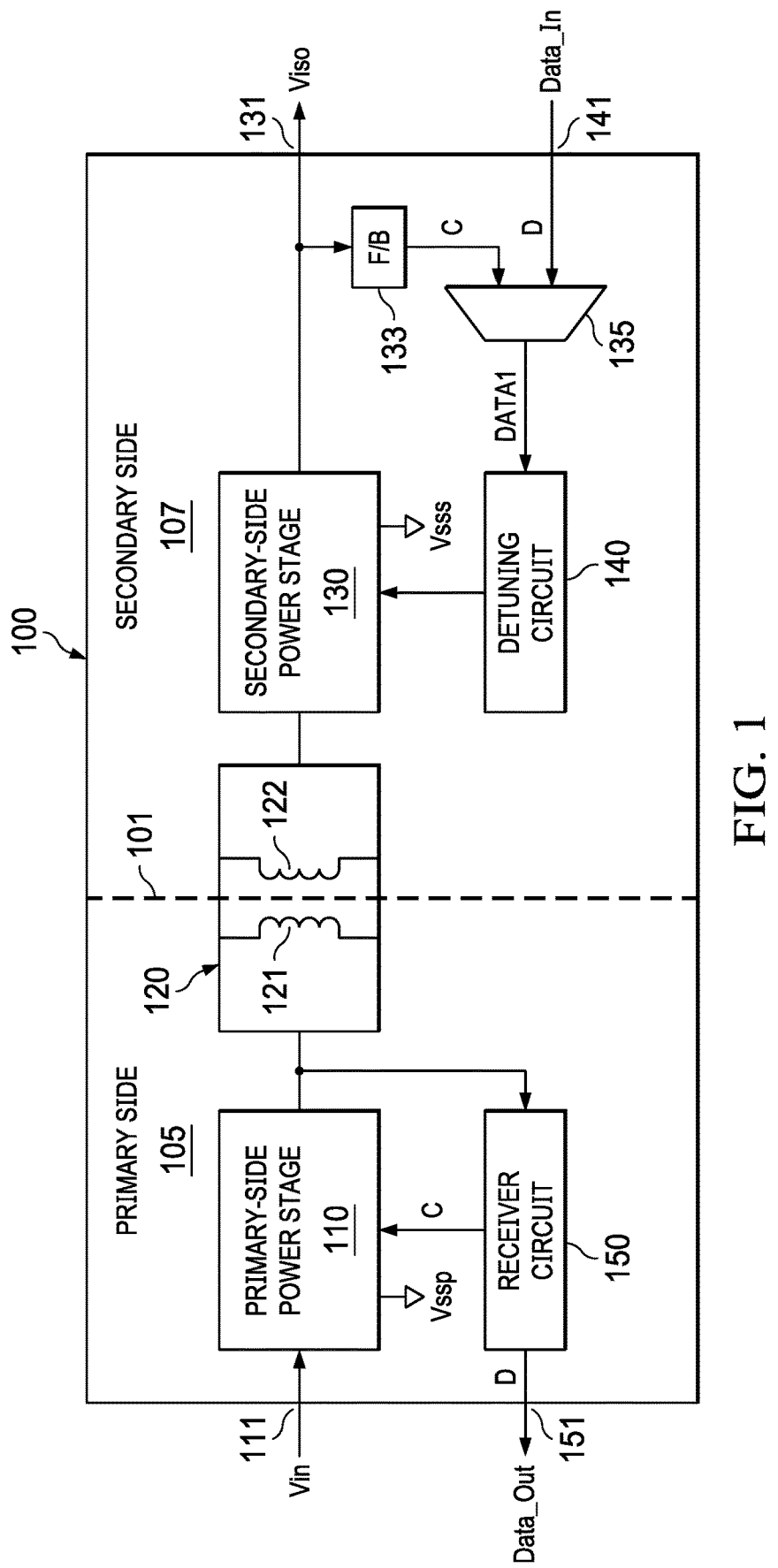
FIG. 1 is a block diagram of an isolated power converter having a data channel that shares an isolation transformer with the power channel in accordance with an example.

FIG. 1 is a block diagram of an isolated power converter 100 in accordance with an example embodiment. The isolated power converter 100 has a primary side 105 and a secondary side 107. The isolated power converter 100 includes a transformer 120 that is operable as an isolation transformer to galvanically isolate the primary side 105 from the secondary side 107. The dashed line 101 delineates the primary side 105 from the secondary side 107. No electrical connection is present between the primary and secondary sides. The terms "primary" and "secondary" refer to the primary and secondary inductors of the transformer.

The primary side 105 includes a voltage input 111 and a data output 151. The input voltage provided to the voltage input 111 is Vin, and the data output signal on the data output 151 is Data_Out. The secondary side 107 includes a voltage output 131 and a data input 141. The isolated output voltage from the voltage output 131 is Viso, and the data input signal provided to the data input 141 is Data_In. The primary side 105 includes a primary-side power stage 110 and a receiver circuit 150. The secondary side 107 includes a secondary-side power stage 130, a detuning circuit 140, a feedback (F/B) circuit 133, and a multiplexer 135. The primary side 105 has a ground Vssp. The secondary side 107 has a ground Vsss. The grounds Vssp and Vsss are isolated from each other.

Figure 2:
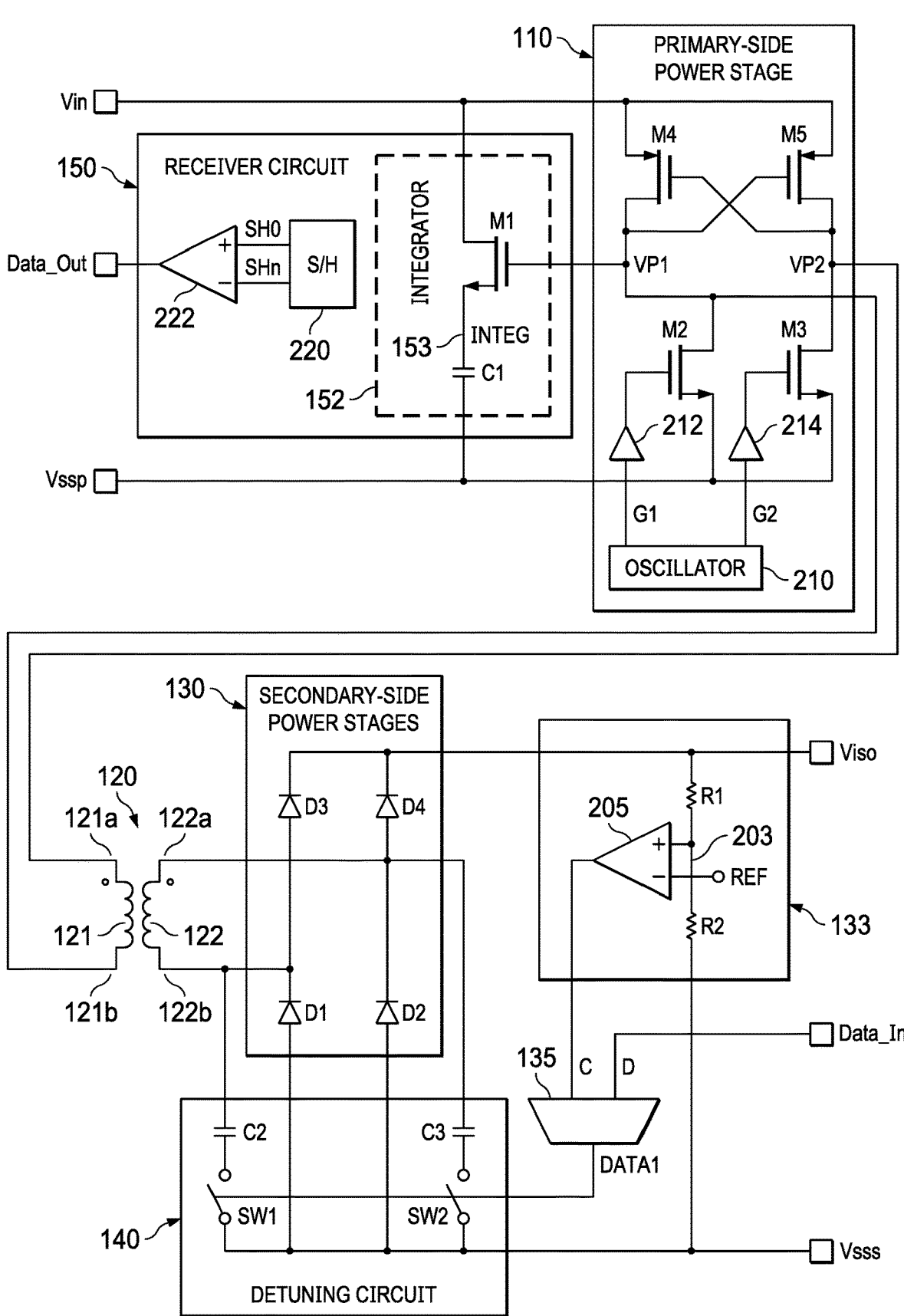
FIG. 2 is a schematic circuit diagram of the isolated power converter illustrating a receiver circuit included in the integrated data channel in accordance with an example.

The transformer 120 has a primary winding 121 and a secondary winding 122. The primary-side power stage 110 receives Vin and the output of the primary-side power stage is coupled to the primary winding 121 of the transformer 120. The secondary-side power stage 130 is coupled to the secondary winding 122 of the transformer 120 and generates the isolated output voltage Viso. A voltage Vin provided to the primary-side power stage 110 results in an isolated output voltage Viso being generated by the secondary-side power stage 130. The voltages Vin and Viso do not share the same ground and are galvanically isolated from each other. FIG. 2 (described below) provides example implementations of the primary-side power stage 110 and the secondary-side power stage 130.

Feedback circuit 133 receives Viso and generates a control (C) bit. In one example, Viso is compared to a reference voltage to generate the control bit (C equal to 0 means that Viso is smaller than the reference voltage, and C equal to 1 means that Viso is greater than the reference voltage). The control bits are communicated through the transformer 120 to control the operation of the power converter to maintain Viso at a regulated voltage level. Data_In is a serial bit stream that represents data that may be unrelated to the control bits. The data bits (D) of Data_In are provided to an input of a multiplexer 135 along with the control bits (C). Logic (not shown) generates a selection signal to control the input selection of the multiplexer 135. The C and D bits are time-division multiplexed together by multiplexer 135 and the resulting interleaved C/D bit stream (DATA1) is provided to the detuning circuit 140. The time division multiplexed C/D bit stream DATA1 is transferred through the transformer 120 to the primary side of the transformer. In another embodiment, DATA1 is one of the C bits or the D bits and is not a multiplexed series of C and D bits.

The detuning circuit 140 changes an electrical characteristic of the secondary-side power stage 130 depending on the voltage level of DATA1, and thus depending on the voltage level of Data_In. The change in the electrical characteristic of the secondary-side power stage 130 causes a change in an electrical characteristic in the primary-side power stage 110. The receiver circuit 150 detects the change in the electrical characteristic in the primary-side power stage 110 to recover the data being transmitted across the transformer 120. In one embodiment (e.g., FIG. 2), the detuning circuit 140 changes the resonant frequency of the secondary-side power stage 130. The change in the resonant frequency of the secondary-side power stage 130 causes a change in a voltage slew rate within the primary-side power stage 110. The receiver circuit 150 includes an integrator which integrates the voltage within the primary-side power stage to thereby generate an integration signal. The change in the voltage's slew rate results in a different magnitude of the integration signal. The integration signal represents the data (DATA1) being transmitted across the transformer 120. Data_Out includes DATA1 which can be demultiplexed to recover the C bits separate from the D bits. The C bits are used to control the primary-side power stage (e.g., to turn it on if C equals 0 and to turn it off if C equals 1). The D bits are provided to and consumed by logic (not shown).

FIG. 2 is a schematic circuit depicting one embodiment for the implementation of the block diagram shown in FIG. 1. In this example, the primary-side power stage 110 includes transistors M2-M4, gate drivers 212 and 214, and oscillator 210. Transistors M2 and M3 are N-type metal-oxide semiconductor field effect transistors (NMOS transistors). Transistors M4 and M5 are P-type metal-oxide semiconductor field effect transistors (PMOS transistors). Transistors M4 and M5 are cross-coupled with the gate of each transistor coupled to the drain of the other transistor. The sources of transistors M4 and M5 are coupled together and to Vin. The drains of transistors M4 and M2 are coupled together, and the drains of transistors M5 and M3 are coupled together. The connection between the drains of transistors M4 and M2 is a switch node (also referred to as a "switch terminal") labeled VP1. The connection between the drains of transistors M5 and M3 is a switch node labeled VP2. The sources of transistors M2 and M3 are coupled together and to ground VSSP.

Figures 3, 4:
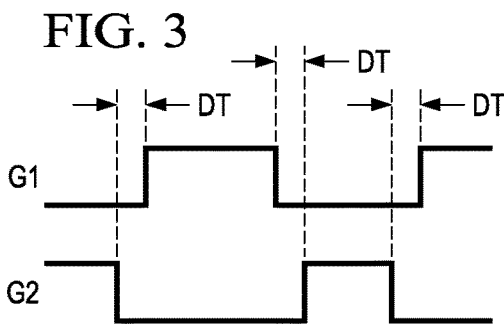
FIG. 3 is a timing diagram showing illustrative gate signals for controlling transistors within the primary side of the power converter in accordance with an example.
FIG. 4 shows waveforms depicting the decoding of a "0" bit on the data channel in accordance with an example.

Transistor M4 is driven by the voltage of switch node VP2, and transistor M5 is driven by the voltage of switch node VP1. Transistors M2 and M3 are actively driven by oscillator 210. Oscillator 210 generates oscillation signals G1 and G2. Oscillation signal G1 is coupled to the gate of transistor M2 via gate driver 212. Oscillation signal G2 is coupled to the gate of transistor M3 via gate driver 214. FIG. 3 shows example waveforms for oscillation signals G1 and G2. When oscillation signal G1 is high (and, accordingly, transistor M2 is on), oscillation signal G2 is low (and, accordingly, transistor M3 is off). Similarly, when oscillation signal G2 is high (and transistor M3 is on), oscillation signal G1 is low (and transistor M2 is off). The oscillator 210 implements a "dead time" (DT) after turning off one transistor and before turning on the other transistor to ensure that both transistors are not on at the same time. The frequency of the oscillation signals G1 and G2 produced by the oscillator 210 may be in the range of 1 MHz to 500 MHz. In another embodiment, rather than transistors M4 and M5 being cross-coupled to each other, transistors M4 and M5 can be actively driven by oscillator 210.

The voltage on the switch nodes VP1 and VP2 toggles between Vin (e.g., 3.3V, 5V, etc.) and Vssp. When oscillation signal G2 is high and G1 is low, transistor M3 is on and transistor M2 is off. With transistor M3 being on, switch node VP2 is pulled down to Vssp. Switch node VP2 being ground (Vssp) also causes PMOS transistor M4 to be turned on thereby pulling switch node VP1 up to Vin. Similarly, when oscillation signal G1 is high and G2 is low, transistor M2 is on and transistor M3 is off. With transistor M2 being on, switch node VP1 is pulled down to Vssp. Switch node VP1 being low also causes PMOS transistor M5 to be turned on thereby pulling switch node VP2 up to Vin.

The instantaneous voltage on each switch node VP1 and VP2 is a square wave having the same frequency as the oscillation signals G1 and G2 from the oscillator 210. The average voltage on each switch node is DUTY*Vin, where "DUTY" is the duty cycle of transistors M4 and M5. That is, during each period of G1 and G2, transistors M4 and M5 are on for a fraction (the duty cycle) of the period. For example, if M4 has a duty cycle of 0.75 (75%), then the average voltage on switch node VP1 is 0.75*Vin. In one example, the average voltage on switch node VP2 is equal to the average voltage on switch node VP1.

Primary winding 121 of transformer 120 has terminals 121a and 121b. Terminal 121a connects to switch node VP2 (and thus to a transistor pair including transistors M3 and M5) and terminal 121b connects to switch node VP1 (and thus to a transistor pair including transistors M2 and M4). Due to the switching waveforms on switch nodes VP1 and VP2, energy is transferred from the primary winding 121 to the secondary winding 122 of the transformer 120. The secondary-side power stage 130 includes four diodes D1-D4. The cathodes of diodes D3 and D4 connect together and provide the isolated output voltage, Viso. The anode of diode D3 connects to the cathode of diode D1 and to terminal 122b of secondary winding 122. The anode of diode D4 connects to the cathode of diode D2 and to terminal 122a of secondary winding 122. The cathodes of diodes D1 and D2 connect together and to ground Vsss (which is isolated from ground Vssp). The four diodes D1-D4 of the secondary-side power stage are configured as a full-bridge rectifier to rectify the voltage from the secondary winding 122 to produce the isolated output voltage Viso. In other embodiments, the secondary-side power stage 130 comprises two diodes configured as a half-bridge rectifier. In yet other embodiments, an active bridge rectifier can be implemented with actively driven transistors replacing the diodes.

The feedback circuit 133 includes resistors R1 and R2 and a comparator 205. The multiplexer 135 has one input that receives Data_In (D) and another input that is coupled to the output of a comparator 205. Resistors R1 and R2 are connected in series between Viso and Vsss and function as a voltage divider to produce a scaled down version of Viso on node 203 which is the connection point between resistors R1 and R2. In this example, the non-inverting (+) input of the comparator 205 is coupled to node 203 and the inverting (−) input of the comparator is coupled to a reference voltage (REF). The voltage on node 203 is compared to REF to produce the C bits. C is a "0" responsive to the scaled down version of Viso (voltage on node 203) being less than REF. C is a "1" when the voltage on node 203 is greater than REF. The C bits are multiplexed with the D bits by multiplexer 135 to produce DATA1. DATA1 is provided to the detuning circuit 140.

In the example of FIG. 2, the detuning circuit 140 includes capacitors C2 and C3 and switches SW1 and SW2. Each switch comprises a transistor (e.g., an NMOS or PMOS transistor). Capacitor C2 is coupled to terminal 122b of secondary winding 122. Capacitor C3 is coupled to terminal 122a of the secondary winding. Switch SW1 is coupled between capacitor C2 and Vsss. Switch SW2 is coupled between capacitor C3 and Vsss. DATA1 controls the on and off state of switches SW1 and SW2. In one example, when DATA1 is at a first voltage level (e.g., above a minimum voltage to turn on switches SW1 and SW2), transistors SW1 and SW2 are on thereby electrically coupling capacitors C2 and C3 to Vsss. When DATA1 is at a second voltage level (e.g., below the minimum voltage for switches SW1 and SW2 to be on), switches SW1 and SW2 are off thereby electrically decoupling capacitors C2 and C3 from Vsss. Accordingly, depending on the voltage level of DATA1, capacitors C2 and C3 either electrically coupled their respective secondary winding terminals to Vsss or electrically decoupled from their respective secondary winding terminals from Vsss.

When the switches SW1 and SW2 are turned on, capacitors C2 and C3 change the resonant frequency of the secondary winding 122 of the transformer 120. That is, the resonant frequency of the secondary winding is an example of the electrical characteristic mentioned above that is changed based on Data_In. The resonant frequency is a first frequency when switches SW1 and SW2 are off and is a second frequency when switches SW1 and SW2 are on. A change in the resonant frequency of the secondary winding 122 causes a change in the slew rate of the voltage on primary winding's terminals 121a and 122b and thus a change in the slew rate of the switch node voltages VP1 and VP2. The change in the switch node voltage slew rate is the change in the electrical characteristic in the primary-side power stage 110 mentioned above.

In the embodiment of FIG. 2, the receiver circuit 150 includes an integrator 152, a sample-and-hold 220, and a comparator 222. The integrator 152 is connected to switch node VP1. In another embodiment, the integrator 152 is connected instead of switch node VP2. The illustrative integrator 152 includes an NMOS transistor M1 whose gate is coupled to switch node VP1. The drain of transistor M1 is coupled to Vin, and the source of transistor M1 is coupled to one terminal of capacitor C1, and the other terminal of capacitor C1 is coupled to Vssp. The connection point 153 between capacitor C1 and the source of transistor M1 is coupled to an input of sample-and-hold 220. The signal on connection point 153 is a signal labeled INTEG.

The voltage on switch node VP1 is the gate voltage of transistor M1. The magnitude of the drain current through transistor M1 is controlled by the gate-to-source voltage (Vgs) of transistor M1. While the voltage on the switch node VP1 is high enough to keep transistor M1 on, current flows through transistor M1 to the capacitor C1. As the capacitor C1 charges, the voltage across C1 (the INTEG signal) increases. Upon a transition of the voltage on the switch node VP1 from a higher level to a lower level (and at a slew rate that is influenced by the detuning circuit 140), the voltage on the gate of transistor M1 decreases. Despite a falling gate voltage, the voltage across capacitor C1 continues to increase as drain current through transistor M1 continues to flow (albeit a diminishing drain current due to a decreasing Vgs of transistor M1). Upon the Vgs of transistor M1 falling below its threshold voltage (Vt), the drain current through transistor to capacitor C1 ceases. Thus, the voltage magnitude of INTEG when transistor M1 turns off is a function of, among other factors, the slew rate of the voltage on switch node VP1. This effect is illustrated in waveforms of FIGS. 4 and 5.

In one embodiment, a known bit equal to a "0" is transmitted from the detuning circuit 140 through the transformer 120 to the primary-side power stage 110 and receiver circuit 150. In one example, the known bit may be a control bit (C) known to be a 0 at a particular time. The sample-and-hold 220 samples the INTEG upon a 0-bit being transmitted and holds the sample value of INTEG for comparison to other bits by comparator 222. The sample-and-hold 220 includes two outputs, SH0 and SHn. The SH0 output provides the sampled value of INTEG for a known 0-bit, and the SHn output provides the sampled value of INTEG for another data bit. Each such other data that results in a sampled and held value of INTEG on the SHn output is compared to the sampled and held value of INTEG on the SH0 output. The output of comparator 222 is one logic state (e.g., logic high) if the voltage on the SH0 output is larger than the voltage on the SHn output, and is at the other logic state (e.g., logic low) if the voltage on the SHn output is larger than the voltage on the SH0 output. The output signal from the comparator is Data_Out, which is DATA1 (interleaved C and D bits).

FIG. 4 illustrates an example waveform 401 for the voltage on switch node VP1 for a data bit transmitted equal to 0. The switch node voltage VP1 is shown transitioning from a logic high to a logic low at falling edge 405 and then back to the logic high level. The rate at which the switch node voltage decreases during falling edge 405 is affected by the detuning circuit 140. The example of FIG. 4 illustrates a falling edge 405 for VP1 that corresponds to a data bit equal to a "V" which caused the switches SW1 and SW2 to be open (off). With switches SW1 and SW2 open, the circuit path is open between the terminals 122a and 122b of the secondary winding 122 of the transformer 120 and Vsss. As a result of electrically disconnecting the capacitors C2 and C3 from the secondary winding 122, the resonant frequency of the secondary winding is altered which results in a smaller slew rate of the falling edge of the switch node VP1 (as well as switch node VP2) during the falling and rising edges of the switch node voltage. In the example of FIG. 4, the difference in voltage of VP1 (dy) during the falling edge 405 is 2.409V during a time period (dx) of 2.047 ns, which corresponds to an average slope of 1.177 GV/s.

In FIG. 4, waveform 402 is the sample-and-hold output SH0, which is a previously sampled and held INTEG signal for a previously known 0-bit. In this example, the magnitude of SH0 is approximately 650 mV. Waveform 403 is the sample-and-hold output SHn, which is the currently sampled INTEG signal for a bit to be decided as being a 0 or a 1 by the comparator 222. Waveform 404 is the INTEG signal. The INTEG signal increases as identified at 406 while current is flowing through transistor M1 to charge the capacitor C1. Reference numeral 412 identifies the point at which the VP1 voltage has dropped low enough that transistor M1 is turned off. Once transistor M1 turns off, drain current through transistor M1 to capacitor C1 ceases and the remaining voltage on C1 represents an integration of the VP1 voltage between time points 410 and 412—that is, from the time that the integrator is enabled to the time that transistor M1 turns off. The magnitude of INTEG is therefore a function of the area 425 under the waveform 401. The area 425 is a function of the slew rate of the falling edge 405 of the VP1 voltage. Accordingly, the resulting voltage magnitude of INTEG is proportional to the slew rate of the VP1 voltage.

Because FIG. 4 is an example of the transmission of a current 0-bit, and SH0 is the sampled and held value of INTEG for a previous 0-bit, INTEG settles at a voltage that is approximately equal to SH0 (e.g., 650 mV). Reference numeral 420 identifies the point in time at which the sample-and-hold 220 holds the value of INTEG. Because INTEG currently is approximately equal to SH0, SHn is held at approximately the voltage as SH0. With the voltages of SHn and SH0 being approximately equal to each other, the output (Data_Out) of the comparator 222 will be a "0."

Figures 5, 7B:
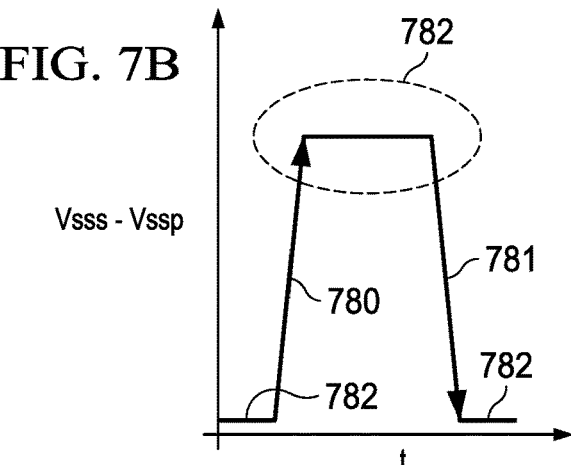
FIG. 5 shows waveforms depicting the decoding of a "1" bit on the data channel in accordance with an example.
FIG. 7B is a graph illustrating the change in voltage difference between grounds on the primary and secondary sides of the isolated power converter leading to the occurrence of the CMT current.

FIG. 5 illustrates example waveforms 501-504 for the transmission of data bit equal to "" T Waveform 501 is the switch node VP 1 voltage. Waveform 502 is the SH0 output, which is the same voltage as waveform 402 in FIG. 4 (e.g., 650 mV). Waveform 503 is the SHn output of the sample-and-hold 220, and waveform 504 is the signal INTEG. The falling edge 505 of the VP1 waveform 501 begins at point 510. At point 512, the VP1 voltage is low enough so as to turn off transistor M1. The slope of the falling edge 505 is characterized in this example by a difference in voltage of VP1 (dy) during the falling edge of 2.416V during a time period (dx) of 1.483 ns, which corresponds to an average slope of 1.628 GV/s. In the examples of FIGS. 4 and 5, the average slope during the falling edge of the VP1 switch node voltage is 1.177 GV/s for a data bit equal to a "0," while the average slope during the falling edge of the switch node voltage is 1.628 GV/s for a data bit equal to a "0" Accordingly, the average slope is larger for data bit equal to 1 than for a data bit equal to 0. Because the slope is higher for a 1-data bit (FIG. 5) than for a 0-data bit (FIG. 4), the area 525 under the curve of the VP1 switch node waveform 501 during falling edge 505 for a 1-data bit is smaller than the corresponding area 425 for a 0-data bit. The integrator 152 within the receiver circuit 150 thus the capacitor C1 receives charge current from transistor M1 for a smaller period of time (e.g., 1.483 ns in FIG. 5 compared to 2.047 ns in FIG. 4) thereby resulting in a smaller magnitude of INTEG once INTEG settles following point 512 when transistor M1 shuts off. Upon transistor M1 turning off, the magnitude of INTEG settles at 650 mV in FIG. 4 but at only 535 mV in FIG. 5. As such, in this example the voltage on SHn is 650 mV for a 0-data bit, and is 535 mV for a 1-data bit. For a 1-data bit, the comparator 222 outputs a logic high for Data_Out because the magnitude of SH0 (for a previously known 0-data bit) is larger than the magnitude of SHn for a 1-data bit.

Because the comparator 222 compares the sample and held magnitude of INTEG for each data bit being transmitted to a sampled and held magnitude of INTEG for a known bit (e.g., a 0-data bit), the receiver circuit 150 is generally immune to variations across temperature, process, or voltage. For example, any increase or decrease in ambient temperature will generally affect the sampled and held value for SH0 the same as for the sampled and held value for each data bit.

Figure 6:
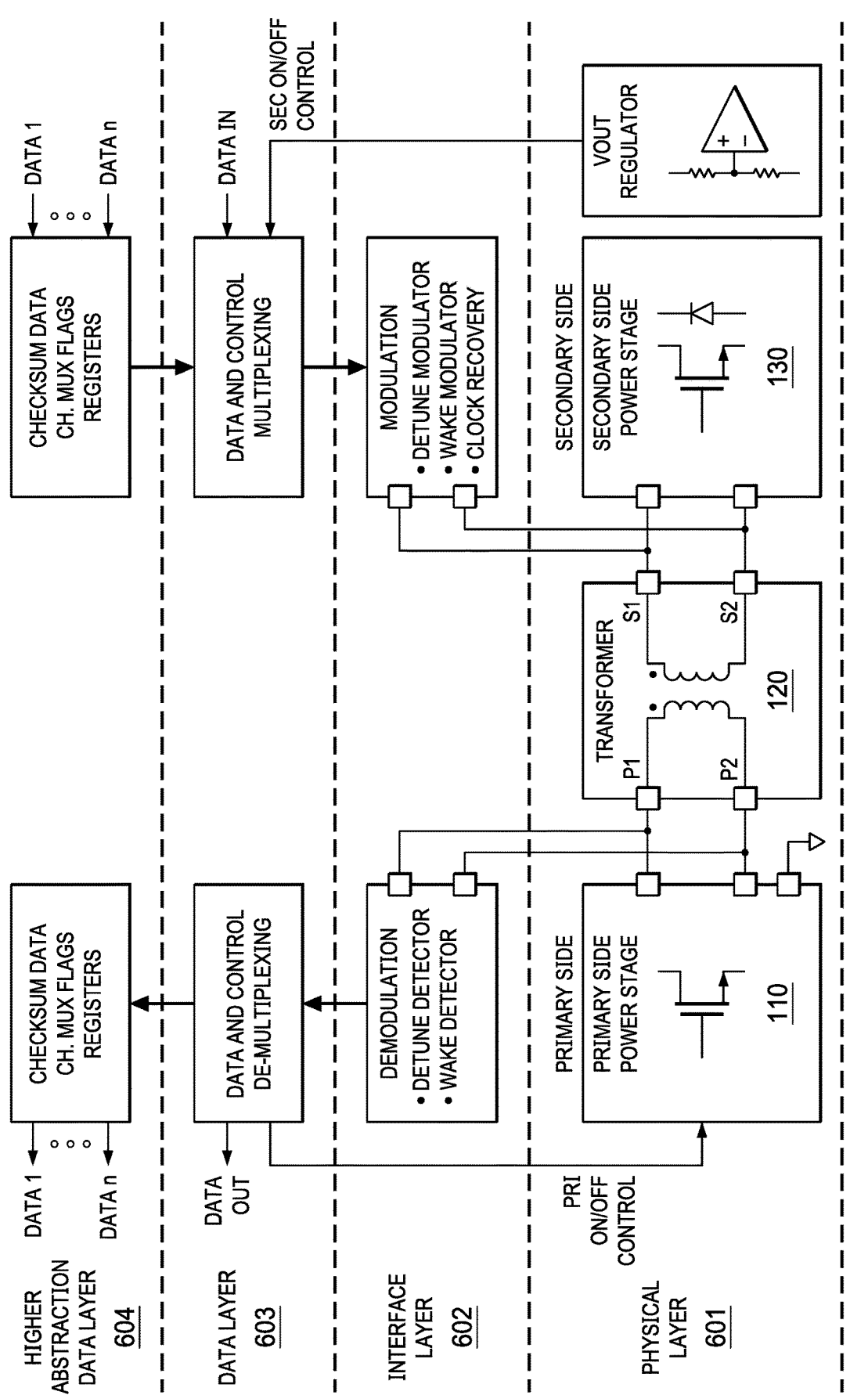
FIG. 6 shows another block diagram of the isolated power converter illustrating a communication layered approach for managing the data encapsulation on the physical channel in accordance with an example.

FIG. 6 is a block diagram of the power converter illustrating a layered approach for managing the data encapsulation on the physical layer 601. The physical layer 601 includes, for example, the primary and secondary side power stages 110 and 130 and the transformer 120. The layers above the physical layer 601 include an interface layer 602, a data layer 603, and a higher abstraction data layer 604. The interface layer 602 includes modulation for the data to be transmitted through the transformer 120 from the secondary side to the primary side. The interface layer 601 also includes demodulation of the received data on the primary side to recover the data. The data layer 603 includes multiplexing of the C and D bits on the secondary side as well as demultiplexing of the interleaved bit stream to recover the C and D bits. The higher abstraction data layer 604 includes data integrity checks such as checksum calculation and verification.

Because the ground Vssp on the primary side 105 of the power converter is isolated from the ground Vsss on the secondary side 107, the possibility exists that a common mode transient can occur which would alter the magnitude of INTEG and thus potentially detrimentally impacting the receiver's ability to correctly decode the transmitted data bits. This problem is illustrated in FIGS. 7A, 7B and 8, and examples of solutions to the problem are illustrated with respect to FIGS. 9A, 9B, 10A, and 10B.

Figure 7A:
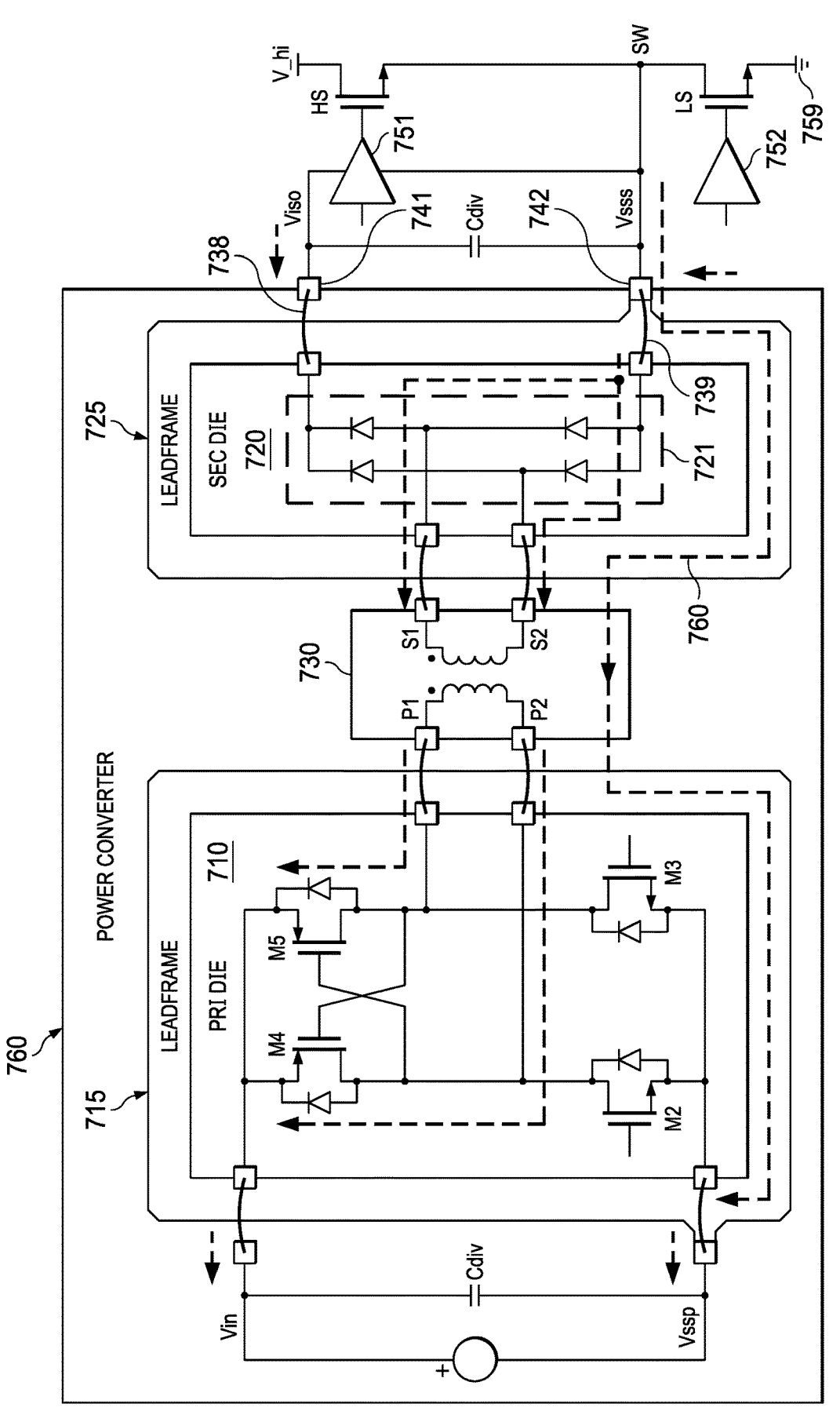
FIG. 7A is a block diagram of an isolated power converter illustrating the occurrence of a common mode transient (CMT) current.
Figure 8:
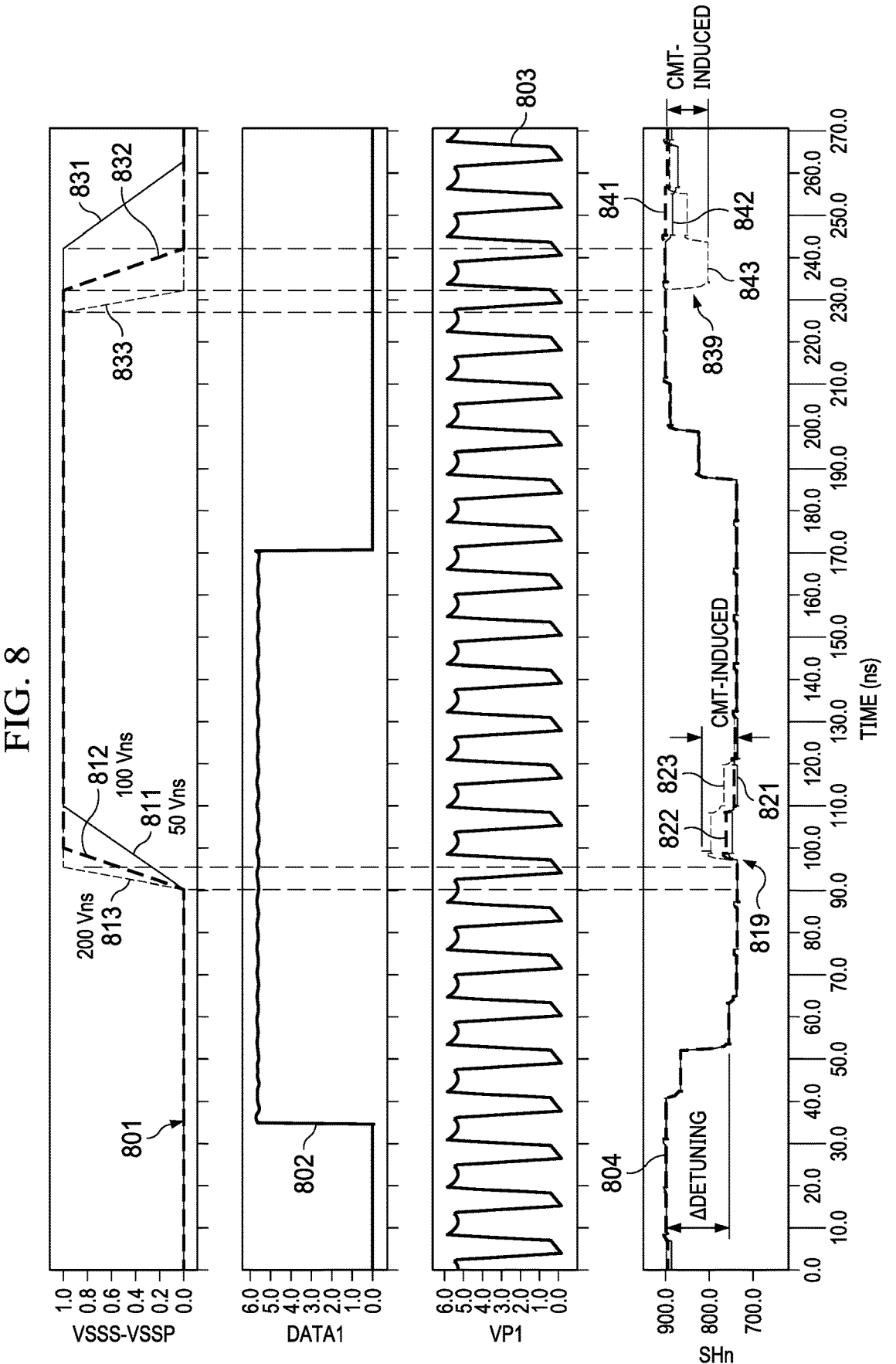
FIG. 8 is a timing diagram illustrating the effect of the CMT current on the ability of a receiver circuit within the isolated power converter to correctly decode the data bits.

FIG. 7A is a schematic diagram illustrating an embodiment of an isolation converter 700 without a data channel including the detuning circuit 140 and receiver circuit 150 described above. In this example, the power converter 700 includes a transformer 730, a primary die 710 ("primary" being a reference to the primary side of the transformer 730) mounted to a leadframe 715, and a secondary die 720 mounted to a leadframe 725. The transistors M2-M4 are fabricated on the primary die 710 and a bridge rectifier 721 is fabricated on the secondary die 720. The dies 710 and 720 (and their respective lead frames) and the transformer 730 are packed as a single module. The power converter 700 has contact pads 741 and 742 (and other contact pads as well). The isolated voltage Viso from the secondary die 720 is connected to contact pad 741 by way of, for example, bond wire 738. The isolated ground Vsss is connected to contact pad 742 by way of bond wire 739.

FIG. 7A also shows an example of how the power converter 700 (as well as the other power converter embodiments described herein) can be used. In this example, the power converter 700 provides an operating voltage for a gate driver 751 of a high side (HS) transistor. The HS transistor is coupled to a low side (LS) transistor at a switch node (SW). the HS and LS transistors may be controlled to produce a signal on the switch node to drive a load (e.g., a motor). Gate driver 751 receives an input signal (from logic, not shown) and drives the gate of the HS transistor. Similarly, gate driver 752 receives an input signal (from logic, not shown) and drives the gate of the LS transistor.

The power terminals to the gate driver 751 are connected to Viso and Vsss as shown in FIG. 7A. The ground terminal (Vsss) of the gate drier 751 is also connected to the switch node SW between the HS and LS transistors. The drain of the HS transistor is copied to a voltage node V_hi. In one example, V_hi is larger than Viso. For example, Viso may be 3.3V or 5V and V_hi may be 1000V. The source of the LS transistor is connected to a ground 759, which may be different than ground Vssp. The HS and LS transistors are switched on and off, but both transistors are not turned on simultaneously. When the LS transistor is on, Vsss is pulled to ground 759 through the LS transistor. When the HS transistor is on, Vsss is pulled up to V_hi through the HS transistor. Thus, the voltage on the isolated ground Vsss of the power converter 700 may have a substantial voltage swing due to the operation of the load (e.g., the HS and LS transistors in this example) and the supply voltage provided to the load.

FIG. 7B is a graph of the voltage difference between the secondary side ground Vsss and the primary side ground Vssp (Vsss-Vssp). When the LS transistor is turned off and the HS transistor on, the voltage on the switch node SW increases rapidly from ground 759 to V_hi. Because Vsss is the same potential as the switch node SW, Vsss also increases from the potential of ground 759 to V_hi, and thus the Vsss-Vssp increases as depicted by rising edge 780 in the graph of FIG. 7B. The magnitude of the increase in Vsss-Vssp occurs over a short period of time—the period of time the transistors M1 and M2 take to change their power state (from off to on, and vice versa). The substantial and rapid change in the potential difference between Vsss and Vssp causes a common mode transient current 760 to flow from the ground node Vsss and through the secondary winding of the transformer 730. The transient current then induces a corresponding common mode transient current 761 in the primary winding of the transformer 730, which then flows through the primary side ground node Vssp. A common mode transient current also flows in the opposite direction from that shown in FIG. 7A when the LS transistor is turned which rapidly pulls the switch node voltage down to ground 759 resulting in a rapid and large decrease in Vsss-Vssp (falling edge 781 in the graph of FIG. 7B). During the steady state portions 782 of Vsss-Vssp, the common mode current is 0 amperes (no common mode current).

FIG. 8 illustrates the effect of the common mode transient current on the ability of the receiver circuit 150 to correctly decode the data bits. FIG. 8 includes waveforms 801, 802, 803, and 804. Waveform 801 is an example of Vsss-Vssp. Waveform 802 is DATA1. Waveform 803 is the voltage on switch node VP1. Waveform 804 is output voltage of the sample-and-hold 220. Waveform 801 includes examples of three transients 811, 812, and 813. The difference among the three transients is the slope of Vsss-Vssp. Transient 811 has a slope of 50V/ns. Transient 812 has a larger slope of 100V/ns, and transient 813 has an even larger slope of 200V/ns. Different slopes may result from the different values of switch node parasitic capacitance, which varies with the rating and technology of HS and LS transistors. Other reasons for different slopes include different system-level disturbances. The decreasing slopes for the falling edge of Vsss-Vssp have similar absolute value slopes as for the rising edge of Vsss-Vssp (e.g., −50V/ns for transient 831, −100V/bs for transient 832, and −200V/ns for transient 833).

The CMT currents injected in the switch nodes VP1 and VP0 change the instantaneous values of the node currents from the value established by the transformer current. Accordingly, the change in current due to the CMTs distort the slopes of the switch node falling slopes. The higher the CMT slope, the greater will be the effect on the switch node voltage distortion. This distortion is then converted by the integrator and sampled thereby potentially creating errors in the recovered data.

The effects of the common mode transients cause a change in the sample-and-hold output as can be seen at 819 and at 839. There is little change to the sample-and-hold output 821 and 841 resulting from the transients 811 and 831 at the lower slope magnitudes. However, as the slope magnitudes increase, the change in the sample-and-hold magnitudes increase as well. The sample-and-hold outputs at 822 and 842 show a larger change due to the transients 812 and 832, and the sample-and-hold outputs at 823 and 843 show an even larger change due to the transients 813 and 833.

Figures 9A, 9B:
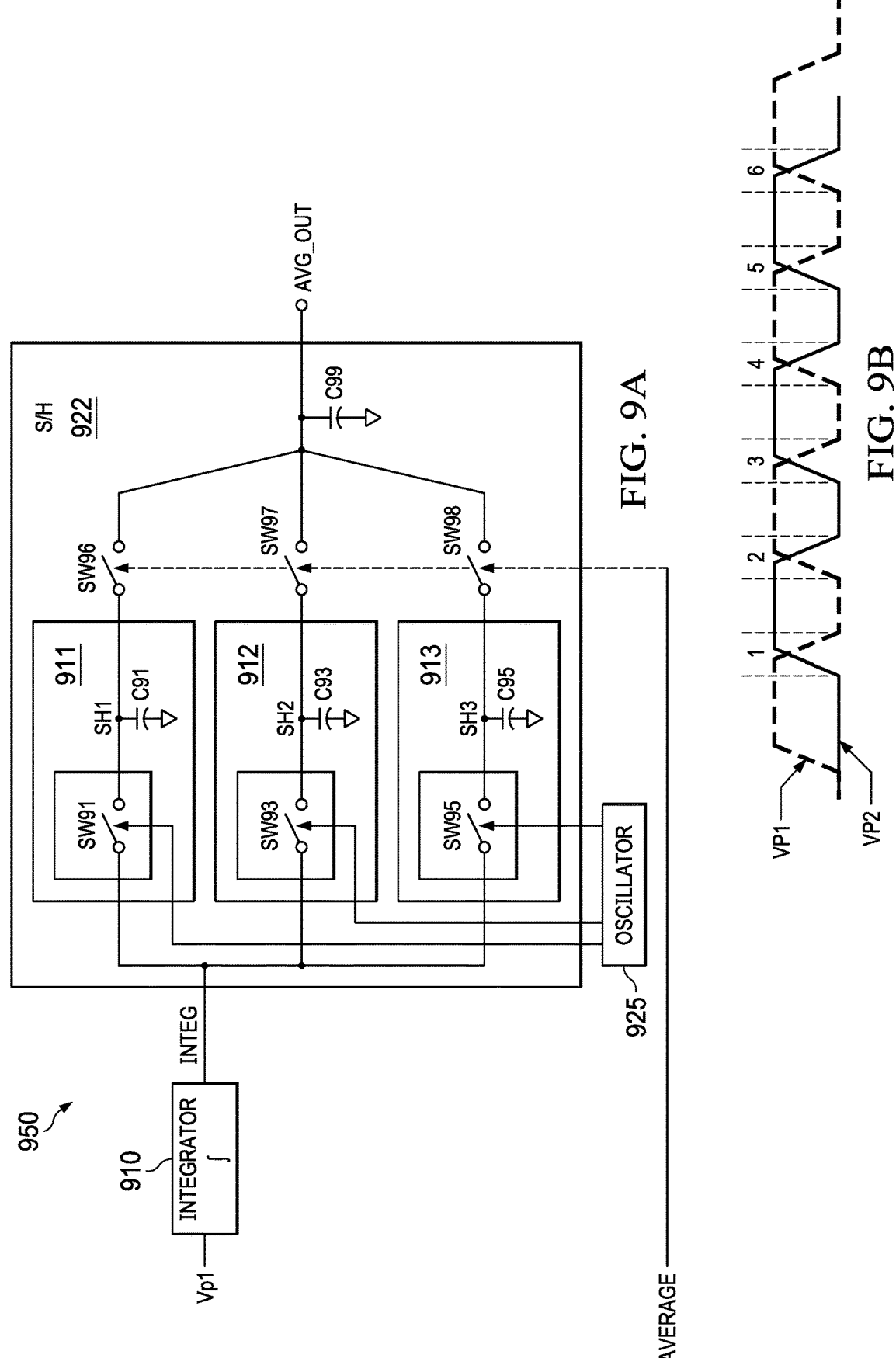
FIG. 9A is a block diagram of a receiver circuit in accordance with an alternative to that shown in FIG. 2.
FIG. 9B includes switching waveforms for switch nodes within the isolated power converter in accordance with an example.

In one embodiment, the effect of the disturbances to the INTEG signal and thus to the sample-and-hold output due to common mode transients are reduced by averaging the sample-and-hold output voltage over multiple switching cycles of the switch node voltage VP1. FIG. 9A shows an example of a receiver circuit 950 which can be used in place of receiver 150 in FIG. 2. Receiver circuit 950 includes an integrator 910 (e.g., transistor M1 coupled to capacitor C1 as shown in FIG. 2) coupled to a S/H 922. The S/H 922 in this example includes sample-and-hold elements 911, 912, and 913 and switches SW96-SW98. Sample-and-hold element 911 includes switch SW91 coupled to capacitor C91. Sample-and-hold element 912 includes switch SW93 coupled to capacitor C93, and sample-and-hold element 913 includes switch SW95 coupled to capacitor C95. The sampled voltages provided on capacitors C91, C93, and C95 are SH1, SH2, and SH3, respectively. Three sample-and-hold elements 911-913 are shown in the example S/H 922 of FIG. 9A, but any suitable number (2 or more) of sample-and-hold elements may be implemented.

The integrator 910 integrates the voltage of the switch node VP1 as explained above to produce the INTEG signal. The S/H 922 includes three sample-and-hold elements 911, 912, and 913. Each sample-and-hold element includes a switch coupled to a capacitor. Each sample-and-hold element samples and holds the INTEG signal in a different switching cycle. For example, sample-and-hold element 911 samples and holds the INTEG signal at switching cycle 1 shown in FIG. 9B. Sample-and-hold element 912 samples and holds the INTEG signal at switching cycle 3, and sample-and-hold element 913 samples and holds the INTEG signal at switching cycle 5. During switching cycles 1, 3, and 5, the switch node voltage VP1 has a falling edge which is used to control the integrator 910 as explained above. If the integrator 910 was connected to the switch node VP2, then the three sample-and-hold elements would be operated to sequentially integrate the INTEG signal during the falling edges of VP2 which occurs during switching cycles 2, 4, and 6. Oscillator 925 generates the gate signals to control the transistors in the primary side power stage 110 (not shown in FIG. 9A) as described above. In this example, oscillator 925 also generates the control signals to operate switches SW91, SW93, and SW95 to cause sample-and-hold elements 911, 912, and 913 to sequentially sample and then hold the magnitude of the INTEG signal on their respective capacitors C91, C93, and C95.

Switches SW96-SW98 are controlled by a single control signal, AVERAGE. Accordingly, all three switches SW96-SW98 are all on (open) or all off (closed). The AVERAGE signal is generated by a digital circuit (not shown) clocked on the same time-base of the switching signals (e.g., G1, G2), which generates sequentially the sampling signals and the AVERAGE signal. While the signal INTEG signal is being sampled sequentially by each of the three sample-and-hold elements, the AVERAGE signal causes the switches SW96-SW98 to be off. After the sample-and-hold elements 911-913 have sampled the INTEG signal on their respective capacitors, the AVERAGE signal causes the switches SW96-SW98 to be closed to thereby cause at least some of the charge from the capacitors C91, C93, and C95 to be transferred to capacitor C99. The averaging takes place as follows. The previous residual charge stored in capacitor C99 (from a previous averaging event) is "QRES" which is equal to C99*V(AVG_OUT) ("C99" is the capacitance of capacitor C99 and "V(AVG_OUT)" is the voltage of AVG_OUT). The charge Q1, Q2, and Q3 stored on the sampling capacitors C91, C93, and C95, respectively, can be expressed as Q1=C91 *V(SH1), Q2=C93*V(SH2), Q3=C95*V(SH3). As the switches SW96, SW97, and SW98 are closed, the total charge QTOT is equal to (QRES+Q1+Q2+Q3). Assuming that the capacitances of C91, C93 and C95 are approximately equal to each other (a value of "CS") and that the capacitance of C99 is substantially smaller, QTOT will be approximately equal to (Q1+Q2+Q3) and after the averaging event V(AVG_OUT) will equal QTOT/CTOT (where "CTOT" is C91+C93+C95, which is equal to 3*CS). Accordingly, V(AVG_OUT) will be equal to (V(SH1)+V(SH2)+V(SH3))/3. The voltage (AVG_OUT) on capacitor C99 is the SHn output that is provided to the comparator 220, as explained above.

Figures 10A, 10B:
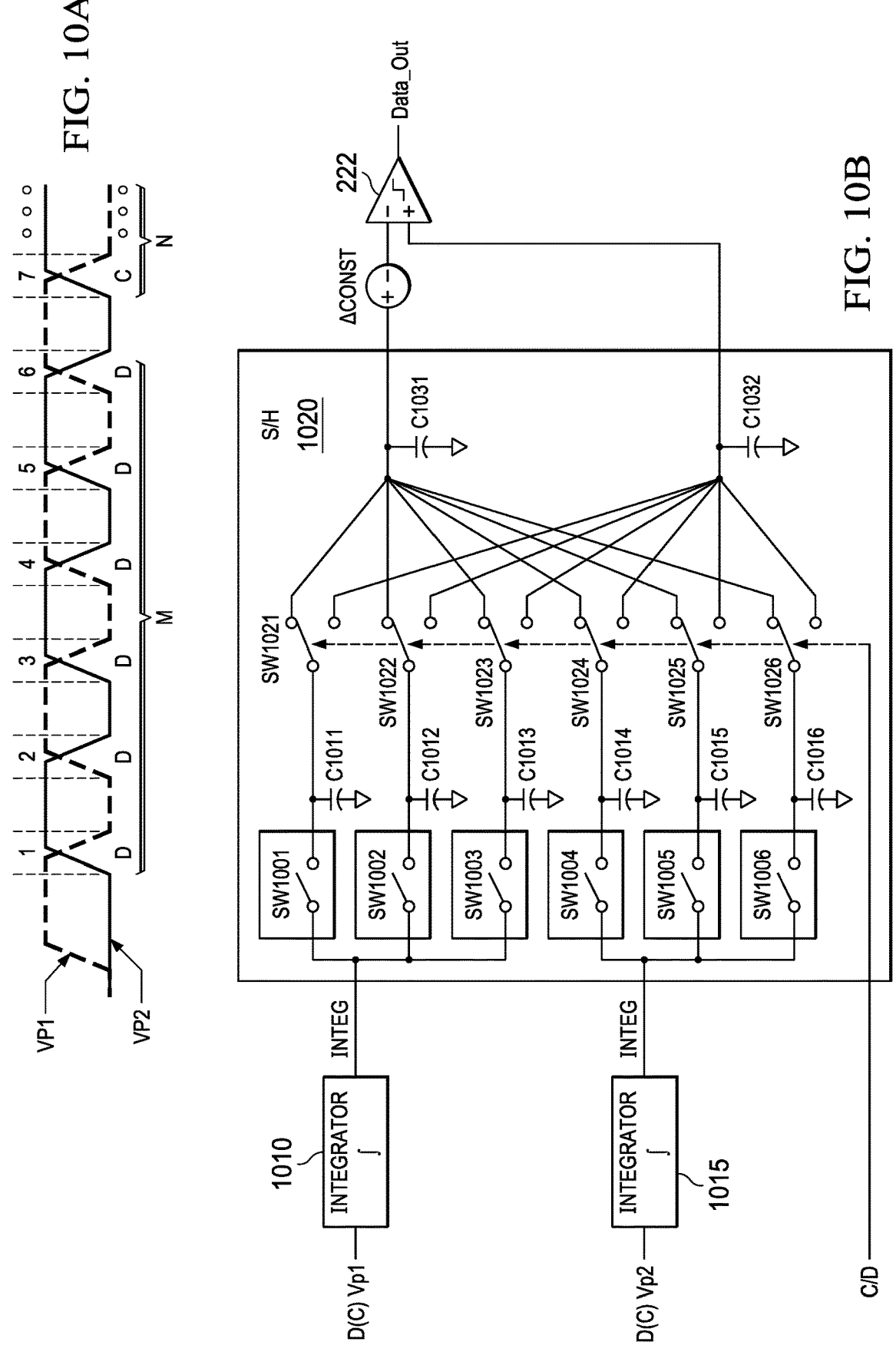
FIG. 10A includes switching waveforms for switch nodes within the isolated power converter illustrating the transfer of data bits and control bits in accordance with an example.
FIG. 10B is a block diagram of a receiver circuit in accordance with an alternative to that shown in FIG. 2 in which multiple instances of data and control bits can be averaged together in accordance with an example.

FIG. 10A is the switching waveforms for the switch node VP1 and VP2 voltages and illustrates that M instances of a data bit (D) are transmitted followed by a N instances of a control bit (C). In one example, the resonance on the secondary winding of the transformer is maintained in accordance with the data (or control) bit to span M switching cycles. In another example, the resonance is maintained for a number of switching cycles equal to M plus Y, where Y is a number of switching cycles preceding the data (or control) bit to allow for the operating state of the converter to settle. In the example of FIG. 10A, M is 6, but M can be other than 6 in other implementations. In some embodiments, the value of N may be equal to M. In other embodiments, M and N are not equal to each other. In FIG. 10 A, a data bit D is transmitted during 6 consecutive switching cycles (labeled 1, 2, 3, 4, 5, and 6). N consecutive instances of a control bit are then transmitted following the end of switching cycle 6. The control bits control the operation of the power converter. For example, and as explained above, the control bits form a part of a control loop to regulate the magnitude of Viso. In one embodiment, the data bits are unrelated to the control of the power converter itself. A device (e.g., a sensor) coupled to the secondary side 107 of the converter provides a serial bit stream Data_In to be transmitted through the isolation barrier provided by the transformer 120 to a device (e.g., a processor) coupled to the primary side 105 of the converter.

FIG. 10B illustrates the use of two integrators 1010 and 1015. Integrator 1010 is coupled to and integrates the falling edges of switch node VP1, and integrator 1015 is coupled to and integrates the falling edges of switch node VP2. Because the switching waveforms of VP1 and VP2 are alternating (VP1 has a falling edge when VP2 has a rising edge, and VP2 has a falling edge when VP1 has a rising edge), an integration can be performed with each falling edge of both VP1 and VP2. In one example, the M instances of a data bit D are recovered from the VP1 and VP2 switch nodes. Integrator 1010 integrates the voltage on switch node VP1 during switching cycles 1, 3, and 5. Integrator 1015 integrates the voltage on switch node VP2 during switching cycles 2, 4, and 6.

Switches SW1001, SW1002, and SW1003 sequentially sample the integrator 1010's output voltage onto the respective capacitors C1011, C1012, and C1013 for each falling edge of VP1. Similarly, switches SW1004, SW1005, and SW1106 sequentially sample the integrator 1015's output voltage onto the respective capacitors C1015, C1016, and C1017 for each falling edge of VP2. Control signal C/D causes switches SW1021-SW1026 to be configured to transfer the charge from capacitors C1011-C1016 to capacitor C1031 when a data bit is being transmitted. When a control bit is being transmitted, control signal C/D causes switches SW1021-SW1026 to be configured to the other state to transfer the charge from capacitors C1011-C1016 to capacitor C1032. The voltage on capacitor C1031 is then compared to the voltage on capacitor C1032 by comparator 222.

The secondary side is in synchronous clocking with the primary side due to the power transfer switching activity creating the clocking base of the system at the secondary side. The primary can determine when a control bit or a data is being sent based on the number of switching cycles which have passed. There might be up to x switching periods of error which can be mitigated by adding x switching periods of tolerance to the data/control framing. This can be accounted for at design time based on how repeatable it is to have the secondary side recognize the first edge created by the primary on the transformer.

Figure 11:
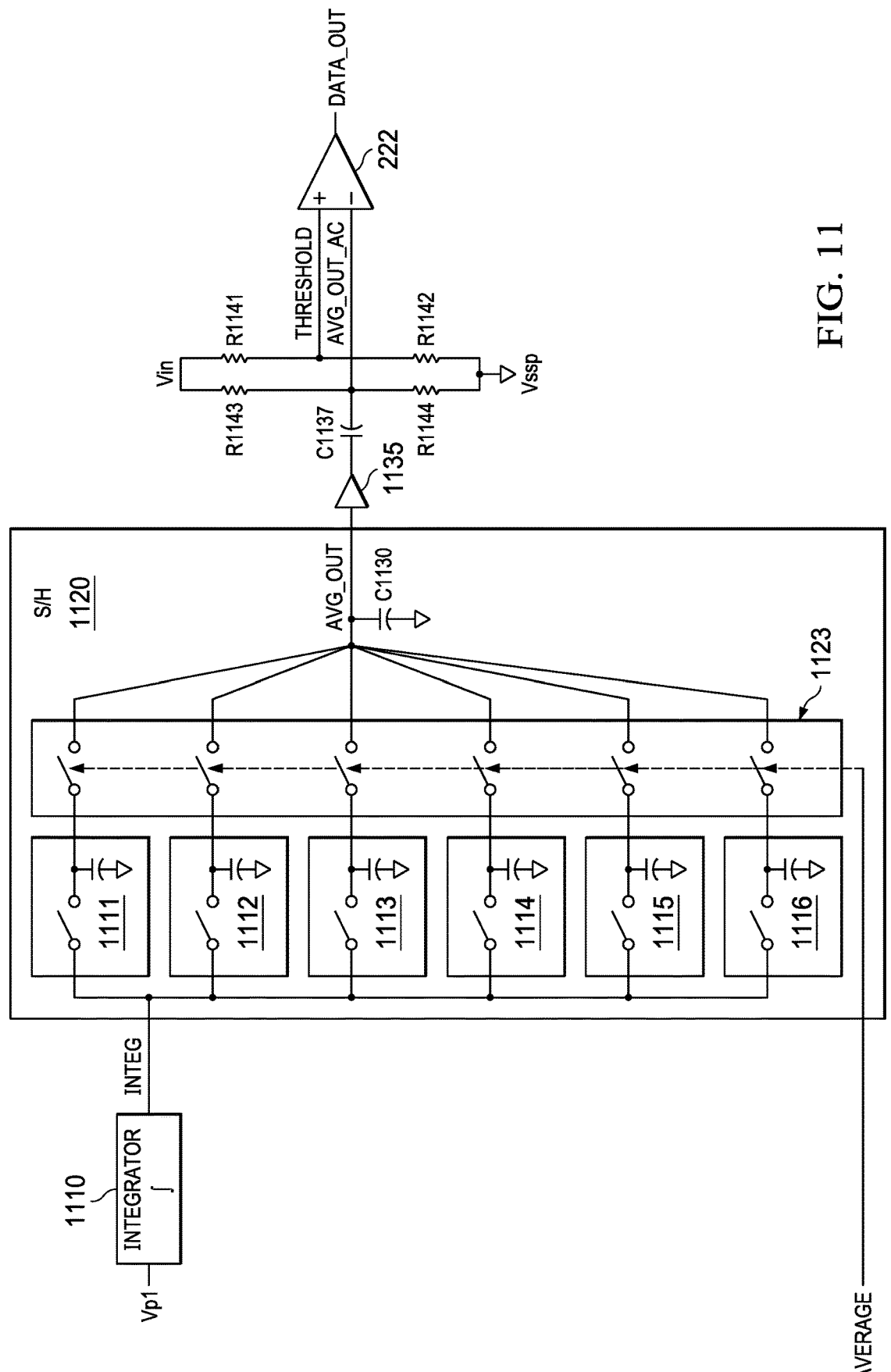
FIG. 11 is a block diagram of a receiver circuit in accordance with an alternative to that shown in FIG. 10B in which multiple instances of data bits can be averaged together in accordance with an example.

In previously described embodiments, SH0 is the sampled and held INTEG signal when a bit being transmitted through the converter is known to be a 0. In the embodiment of FIG. 11 each data bit being received by the receiver circuit is compared to a threshold value (THRESHOLD) instead of previously sampled and held value of the INTEG signal for a known data bit equal to 0. The S/H 120 of FIG. 11 includes six sample-and-hold elements 1111, 1112, 1113, 1114, 1115, and 1116, although as noted previously, any number of sample-and-hold elements (greater than one) can be implemented.

The six sample-and-hold elements 1111, 1112, 1113, 1114, 1115, and 1116 are sequentially operated by an oscillator (not shown) in six switching cycles which in which VP1 has a falling edge. FIG. 11B shows an example of switching cycles 1-6. Each sample-and-hold element is operated in turn during each of the six switching cycles 1-6 to sample and hold the INTEG signal on to each of the six capacitors of the sample-and-hold elements. Switches 1123 are then closed based on the AVERAGE signal to thereby transfer charge on to capacitor C1130 in the same manner as described above. The voltage on capacitor C1130 is labeled AVG_OUT.

Resistors R1143 and R1144 are connected in series between Vin and Vssp. Resistors R1141 and R1142 are coupled in series between Vin and Vssp and form a voltage divider to produce the threshold voltage (THRESHOLD) to the non-inverting input of the comparator 222 for comparison to AVG_OUT_AC. A buffer 1135 is coupled in series with a capacitor C1137 between the capacitor C1130 (and its voltage AVG_OUT) and the connection point between resistors R1143 and R1144, which also is coupled to the inverting input of comparator 222. The capacitor C1137 functions as a DC block capacitor to provide substantially only the AC component of AVG_OUT (labeled as AVG_OUT_AC) to the inverting input of the comparator. Resistors R1141 and R1143 have approximately equal resistance values, and resistors R1142 and R1144 also have approximately equal resistance values. The network of resistors R1141-R1144 create a common mode biasing for the comparator 222 which is proportional to Vin so that the immunity to line transients is improved. The resistances of resistors R1141 and R1142 are selected based on the magnitude of Vin such that the magnitude of THRESHOLD is usable to differentiate the AVG_OUT_AC voltage between a 0-bit and a 1-bit. For example, for a 1-bit, AVG_OUT_AC will be smaller in magnitude than THRESHOLD, but for a 0-bit AVG_OUT_AC will be larger in magnitude than THRESHOLD. In an example embodiment, Vin is equal to 5V, the resistances of R1143 and R1141 are equal to 470 kΩ, and the resistances of R1144 and R1142 are equal to 80 kΩ.

Figure 12:
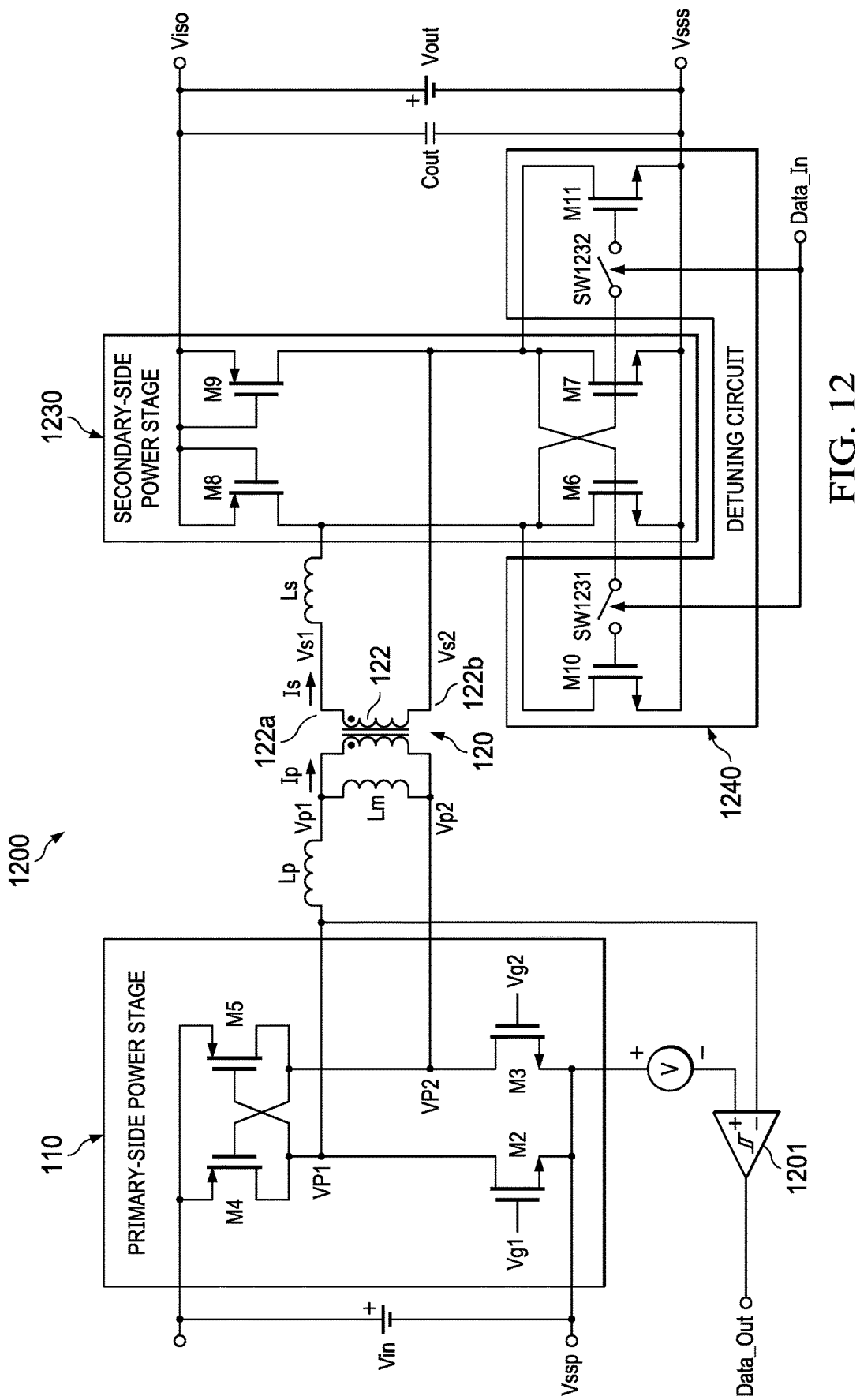
FIG. 12 is a circuit depicting an isolated power converter in accordance with another example.

FIG. 12 is an example of a power converter 1200 that includes the primary-side power stage 110, a secondary-side power stage 1230, transformer 120, detuning circuit 1240, and a comparator 1201. The secondary-side power stage 1230 includes transistors M6-M9. Transistors M6 and M7 are cross-coupled in which the drain of transistor M6 is coupled to the gate of transistor M7, and the drain of transistor M7 is coupled to the gate of transistor M6. The drains of transistors M8 and M9 are coupled together and to terminal 122*a* of the secondary winding 122. The drains of transistors M6 and M8 are coupled together and to terminal 122*a* of the secondary winding 122. The drains of transistors M7 and M9 are coupled together and to terminal 122*b* of the secondary winding 122. Transistors M6-M9 function the same as a full-wave bridge rectifier with a rectification drop of (Vthp+Rdsonn*Is), where Vthp is the threshold voltage of PMOS transistors M8 and M9, Rdsonn is the on-resistance of NMOS transistors M6 and M7, and Is is the transformer current through the transformer's secondary winding 122.

Detuning circuit 1240 includes transistors M10 and M11 and switches SW1231 and SW1232. Switches SW1231 and SW1232 also may be transistors. The drain and source of transistor M10 is coupled to the drain and source of transistor M6. The drain and source of transistor M11 is coupled to the drain and source of transistor M7. Switch SW1231 is coupled between the gate of transistor M10 and the drain of transistor M7. When switch SW1231 is closed, the voltage on the drain of transistor M7 is applied to the gate of transistor M10, in addition to the gate of transistor M6. When switch SW1231 is open, the gate of transistor M10 is electrically disconnected from the drain of transistor M7. Similarly, switch SW1232 is coupled between the gate of transistor M11 and the drain of transistor M6. When switch SW1232 is closed, the voltage on the drain of transistor M6 is applied to the gate of transistor M11, in addition to the gate of transistor M7. When switch SW1232 is open, the gate of transistor M11 is electrically disconnected from the drain of transistor M6. Data_In controls the open and closed status of switches SW1231 and SW1232. For example, when Data_In is logic high, switches SW1231 are closed and when Data_In is logic low, switches SW1231 are open.

When switch SW1231 is closed, a current path through transistor M10 is created in addition to the current path through transistor M6. When switch SW1231 is open, the parallel current path through transistor M10 is not present. Thus, when transistor M6 is on, a parallel current path through transistor M10 exists based on one state of Data_In (e.g., a logic high for a data bit) or does not exist if the other logic state of Data_In is present (e.g., logic low). A similar effect on current through transistors M7/M11 occurs as well based on Data_In. At the same time the switch node capacitance is selectively loaded with additional gate-to-source parasitic capacitance (Cgs) and gate-to-drain parasitic capacitance (Cgd) of transistors M10 and M11 causing a change in the resonant behavior of the secondary side. The difference in resonance causes a change in the slope of the falling and rising edges on the switch nodes VP1 and VP2 within the primary-side power stage.

The receiver circuit in FIG. 12 is the comparator 1201. The embodiment of FIG. 12 does not include an integrator. Instead, the non-inverting input of comparator 1201 is coupled to Vssp (and is slightly below ground potential Vssp as indicated by the voltage source between the non-inverting input and Vssp). The inverting input of comparator 1201 is coupled to one of the switch nodes (VP1 in this example). The comparator 1201 compares the switch node voltage to Vssp to generate the output data, Data_Out. In this example implementation, comparator 1201 has a threshold which is slightly below ground. In one state (e.g., when 0-data bit is transmitted) the voltage on switch node VP1 falls to Vssp−Rdsonn*Ip1 (where Ip1 is the current through primary winding of the transformer 120) and the comparator 1201 outputs a "0." In the other state (e.g., a 1-data bit is transmitted) the voltage on switch node VP1 falls to (Vssp−Rdsonn*Ip2) (where Ip2 is the primary winding current). The magnitude of Ip2 is larger than Ip1 due to the data bits' effect on the transformer's resonance.

Some or all of the components of the various isolated power converters described herein may be fabricated on the same integrated circuit (IC). For example, in FIG. 1, all of the components shown may be on the same IC. In another embodiment, the transformer 120 may be a separate component coupled to the IC containing the primary-side power stage 110, the secondary-side power stage 130, the feedback circuit 133, the multiplexer 135, the detuning circuit 140, and the receiver circuit 150.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon field effect transistor ("MOSFET") may be used in place of an n-type MOSFET with little or no changes to the circuit. Furthermore, other types of transistors may be used (such as bipolar junction transistors (BJTs)).

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

Modifications are possible in the described embodiments, and other embodiments are possible, within the scope of the claims.

What is claimed is:

1. A circuit, comprising:
a primary side power stage having power inputs and power outputs, the power outputs coupled to primary side terminals of a transformer; and a data receiver circuit having a receiver data input and a receiver data output, the receiver data input coupled to a primary side terminal of the primary side terminals of the transformer.

2. The circuit of claim 1, wherein the data receiver circuit has a receiver power input coupled to a first one of the power inputs, and the data receiver circuit includes:
a transistor coupled between the receiver power input and the receiver data output, the transistor having a control terminal coupled to the receiver data input; and
a capacitor coupled between the receiver data output and a second one of the power inputs.

3. The circuit of claim 2, wherein the data receiver circuit includes a sample-and-hold (S/H) circuit having a S/H input and a S/H output, the S/H input coupled to the capacitor, and the S/H output coupled to the receiver data output.

4. The circuit of claim 3, wherein the S/H output is a first S/H output, and the S/H circuit has a second S/H output; and
wherein the data receiver circuit includes a comparator having first and second comparator inputs and a comparator output, the first S/H output coupled to the first comparator input, the second S/H output coupled to the second comparator input, and the comparator output coupled to the receiver data output.

5. The circuit of claim 4, wherein the S/H circuit is configured to provide a first signal at the first S/H output and a second signal at the second S/H output, the first and second signal representing a state of the receiver data output sampled at different times.

6. The circuit of claim 3, wherein the data receiver circuit includes a comparator having first and second comparator inputs and a comparator output, the first comparator input coupled to the S/H output, the second comparator input coupled to the receiver power input, and the comparator output coupled to the receiver data output.

7. The circuit of claim 3, wherein the S/H circuit is configured to provide a signal at the S/H output representing an average state of the receiver data output.

8. The circuit of claim 3, wherein the S/H input is a first S/H input coupled to a first one of the primary side terminals, and the S/H circuit has a second S/H input coupled to a second one of the primary side terminals.

9. The circuit of claim 1, wherein the receiver data output is a first data output, the data receiver circuit includes a second receiver data output, and the primary side power stage has a control input coupled to the second receiver data output.

10. The circuit of claim 1, wherein the primary side power stage includes:
a first transistor coupled between a first one of the power inputs and a first one of the power outputs, the first transistor having a first control terminal coupled to a second one of the power outputs;
a second transistor coupled between the first one of the power inputs and the second one of the power outputs, the second transistor having a second control terminal coupled to the first one of the power outputs;
a third transistor coupled between the first one of the power outputs and a second one of the power inputs, the third transistor having a third control terminal;
a fourth transistor coupled between the second one of the power outputs and the second one of the power inputs, the fourth transistor having a fourth control terminal; and a signal generator circuit having first and second outputs, the first output coupled to the third control terminal, and the second output coupled to the fourth control terminal.

11. The circuit of claim 1, wherein the power inputs are first power inputs, the power outputs are first power outputs, and the circuit further comprises:

a secondary side power stage having second power inputs and second power outputs, the second power inputs coupled to secondary side terminals of the transformer;

a data transmit circuit having a transmit data input and a transmit data output, the transmit data output coupled to a terminal of the secondary side terminals; and the transformer having a primary side winding and a secondary side winding, the primary side winding coupled between the primary side terminals, and the secondary side winding coupled between the secondary side terminals.

12. The circuit of claim 11, wherein the data transmit circuit includes:

an electrical component and a switch coupled between the transmit data output and one of the second power outputs, the switch having a switch control terminal coupled to the transmit data input.

13. The circuit of claim 12, wherein the electrical component includes at least one of: a capacitor, a resistor, an inductor, or a diode.

14. The circuit of claim 11, further comprising:

a feedback circuit having feedback inputs and a feedback output, the feedback inputs coupled to the second power outputs; and a multiplexor circuit having first and second multiplexor inputs and a multiplexor output, the first multiplexor input coupled to a data input, the second multiplexor input coupled to the feedback output, and the multiplexor output coupled to the transmit data input.

15. The circuit of claim 11, wherein the secondary side power stage includes:

a first diode coupled between a first one of the second power inputs and a first one of the second power outputs;

a second diode coupled between a second one of the second power inputs and the first one of the second power outputs;

a third diode coupled between the first one of the second power inputs and a second one of the second power outputs; and a fourth diode coupled between the second one of the second power inputs and the second one of the second power outputs.

16. The circuit of claim 11, wherein the data transmit circuit includes a detuning circuit.

17. The circuit of claim 1, wherein the data receiver circuit includes an integrator.

18. A circuit comprising:

a secondary side power stage having power inputs and power outputs, the power inputs coupled to secondary side terminals of a transformer; and a data transmit circuit having a transmit data input and a transmit data output, the transmit data output coupled to a terminal of the secondary side terminals of the transformer.

19. The circuit of claim 18, wherein the data transmit circuit includes:

an electrical component and a switch coupled between the transmit data output and one of the power outputs, the switch having a switch control terminal coupled to the transmit data input.

20. The circuit of claim 19, wherein the electrical component includes at least one of: a capacitor, a resistor, an inductor, or a diode.

21. The circuit of claim 18, further comprising:

a feedback circuit having feedback inputs and a feedback output, the feedback inputs coupled to the power outputs; and a multiplexor circuit having first and second multiplexor inputs and a multiplexor output, the first multiplexor input coupled to a data input, the second multiplexor input coupled to the feedback output, and the multiplexor output coupled to the transmit data input.

22. The circuit of claim 18, wherein the data transmit circuit includes a detuning circuit.

23. The circuit of claim 18, wherein the power inputs are first power inputs, the power outputs are first power outputs, and the circuit further comprises:

a primary side power stage having second power inputs and second power outputs, the second power inputs coupled to primary side terminals of the transformer;

a data receiver circuit having a receiver data input and a receiver data output, the receiver data input coupled to a first one of the primary side terminals of the transformer; and the transformer having a primary side winding and a secondary side winding, the primary side winding coupled between the primary side terminals, and the secondary side winding coupled between the secondary side terminals.

24. The circuit of claim 23, wherein the data receiver circuit has a receiver power input coupled to a first one of the power inputs, and the data receiver circuit includes:

a transistor coupled between the receiver power input and the receiver data output, the transistor having a control terminal coupled to the receiver data input; and a capacitor coupled between the receiver data output and a second one of the power inputs.

25. The circuit of claim 24, wherein the data receiver circuit includes a S/H circuit having a S/H input and a S/H output, the S/H input coupled to the capacitor, and the S/H output coupled to the receiver data output.

26. A circuit, comprising:

a transformer having a primary side winding and a secondary side winding;

a first power stage having first power inputs and first power outputs, the first power outputs coupled to the primary side winding;

a data receiver circuit having a receiver data input and a receiver data output, the receiver data input coupled to the primary side winding;

a second power stage having second power inputs and second power outputs; and a data transmit circuit having a transmit data input and transmit data outputs, the transmit data outputs coupled to the secondary side winding.

27. The circuit of claim 26, wherein the data receiver circuit includes an integrator, and the data transmit circuit includes a detuning circuit.

* * * * *